(12) United States Patent
Tan

(10) Patent No.: US 10,106,234 B2
(45) Date of Patent: Oct. 23, 2018

(54) HIGH SPEED TRIANGULAR SHAPED HYDROPLANING MONOHULL CRAFT WITH AIRCRAFT-LIKE CONTROL SURFACES HAVING SURFACE ADHESION HULL CHARACTERISTICS

(71) Applicant: Yu Lee Tan, Tanjung Bunga (MY)

(72) Inventor: Yu Lee Tan, Tanjung Bunga (MY)

( * ) Notice: Subject to any disclaimer, the term of this patent is extended or adjusted under 35 U.S.C. 154(b) by 0 days.

(21) Appl. No.: 15/328,037

(22) PCT Filed: Jun. 25, 2015

(86) PCT No.: PCT/MY2015/050063
§ 371 (c)(1),
(2) Date: Jan. 22, 2017

(87) PCT Pub. No.: WO2016/013923
PCT Pub. Date: Jan. 28, 2016

(65) Prior Publication Data
US 2017/0203824 A1    Jul. 20, 2017

(30) Foreign Application Priority Data
Jul. 23, 2014  (MY) .............................. PI2014702018

(51) Int. Cl.
*B63H 7/02*    (2006.01)
*B63H 7/00*    (2006.01)
*B63B 1/18*    (2006.01)
*B63B 1/32*    (2006.01)
*B63B 3/48*    (2006.01)
*B63B 7/00*    (2006.01)
*B63B 17/00*   (2006.01)
*B63H 25/38*   (2006.01)

(52) U.S. Cl.
CPC ................. *B63H 7/02* (2013.01); *B63B 1/18* (2013.01); *B63B 1/322* (2013.01); *B63B 3/48* (2013.01); *B63B 7/00* (2013.01); *B63B 17/00* (2013.01); *B63H 7/00* (2013.01); *B63H 25/382* (2013.01); *B63H 2025/384* (2013.01); *Y02T 70/12* (2013.01)

(58) Field of Classification Search
CPC .. B63H 7/02; B63H 25/382; B63H 2025/384; B63B 17/00; B63B 7/00; B63B 1/322; B63B 1/18; B63B 3/48
USPC ........................................................ 114/62
See application file for complete search history.

(56) References Cited

U.S. PATENT DOCUMENTS

| 912,814 | A | * | 2/1909 | Clifford | .................... | B63B 1/20 |
|---|---|---|---|---|---|---|
| | | | | | | 114/288 |
| 1,675,422 | A | * | 7/1928 | Post | ....................... | B63H 25/38 |
| | | | | | | 114/284 |

(Continued)

FOREIGN PATENT DOCUMENTS

JP    51-109688 A    9/1976

*Primary Examiner* — Anthony D Wiest
(74) *Attorney, Agent, or Firm* — Mark M. Friedman

(57) ABSTRACT

The invention is an air propelled boat that has a triangular shaped hydroplaning monohull which has surface adhesion characteristics by means of a concave bottom hull. The invention also has aircraft-like control surfaces (5,6) for safety and control at high speeds. The invention is the only monohull marine craft which produces aerodynamic lift without wings and has air based propulsion (4), air based control surfaces and a unique concave planing hull.

10 Claims, 2 Drawing Sheets

(56) References Cited

U.S. PATENT DOCUMENTS

| | | | |
|---|---|---|---|
| 2,215,919 A | | 9/1940 | Finley |
| 2,682,247 A | * | 6/1954 | Woodsworth ............ B63H 7/02 |
| | | | 114/67 A |
| 2,741,207 A | | 4/1956 | Leone |
| 3,500,784 A | | 3/1970 | Reynolds |
| 3,800,725 A | | 4/1974 | L'Heureux |
| 4,141,308 A | * | 2/1979 | Gainey ................... E02B 15/10 |
| | | | 210/242.1 |
| 4,284,027 A | | 8/1981 | Montez |
| 4,998,898 A | * | 3/1991 | Dufrene .................... B63B 1/18 |
| | | | 114/271 |
| 5,082,465 A | | 1/1992 | Wine |
| 5,464,069 A | * | 11/1995 | Gifford .................... B60V 1/14 |
| | | | 114/67 A |
| 5,526,764 A | * | 6/1996 | Jacobson ................. B60V 1/22 |
| | | | 114/272 |
| 6,990,918 B2 | | 1/2006 | Markie |
| 7,090,549 B2 | | 8/2006 | Garcia |
| 8,453,591 B2 | | 6/2013 | Mannerfelt et al. |
| 2011/0030607 A1 | | 2/2011 | Mannerfelt |
| 2012/0048165 A1 | | 3/2012 | Westerman |

\* cited by examiner

HIGH SPEED TRIANGULAR SHAPED HYDROPLANING MONOHULL CRAFT WITH AIRCRAFT-LIKE CONTROL SURFACES HAVING SURFACE ADHESION HULL CHARACTERISTICS

TECHNICAL FIELD

The invention relates to a craft which is envisaged to be used on and above a body of water. Although the craft has three axis control surfaces similar to an aircraft, it is first and foremost designed to be used as a high speed boat propelled by air based propulsion which is commonly known as an airboat.

BACKGROUND OF THE INVENTION

Most marine craft have water based propulsion and water based control surfaces. However, with increased speeds of marine craft this is no longer sufficient. Aircraft-like control surfaces are required especially at very high speeds where roll and pitch of the craft become extremely important for safety purposes.

Air based propulsion also greatly enhances safety and comfort especially in rougher seas. When a normal water propelled marine craft powers over a wave such that it is completely out of the water, the water based propulsion no longer propels the craft and the craft invariably hits the next wave quite hard. This makes marine based travel quite uncomfortable. However, it should be noted that at extremely high speeds it is outright dangerous. With the addition of air based propulsion and aircraft-like surface controls, this situation changes dramatically. Air based propulsion allows continually effective propulsion for high speed craft. And when combined with aircraft-like three axis control surfaces allow this marine craft to safely maneuver over waves at high speed.

A high speed water craft with air based propulsion and control provides additional benefits in river type environments having a naturally shallow draft and being able to shoot rapids very easily. Such a high speed craft in closed waters requires a very specialised hull; one that is stable at high speeds, hydroplanes efficiently and one that safely allows extreme maneuverability.

Almost all airboats have a square shaped bow. This square bow allows the airboats of prior art to go through marshland but is not suitable for high speed marine operation.

SUMMARY OF THE INVENTION

The invention is a speed boat propelled by air based propulsion commonly known as an airboat which is extremely fast and extremely maneuverable. It has added control features for safety at high speeds.

The said craft's key differences to other water craft is its predominant air based propulsion and air based three axis controls. The hull of the said craft is also very different to other marine craft and even other airboats in that it has a triangular hull with a concave bottom shape. This concave bottom shape allows surface adhesion and allows the craft to resist capsizing regardless of turning radius and speed. The concave bottom effectively acts like a suction cup. Unlike most other airboats which have a very square bow and are mainly used in marshland, the invention has a triangular shaped hull which allows for greater speed and versatility in marine conditions.

The air rudders are the predominant control for the craft. Retractable water rudders are also used for greater traction. Pitch control allows the craft to navigate waves at greater speed with a greater degree of comfort. The control surfaces for roll control are generally used at high speeds.

A class of very high speed marine craft which has air based propulsion and air based control surfaces like the invention are wing in ground-effect (WIG) craft. However, prior art on wing in ground-effect vehicles all have fuselages and wings. Wing in ground-effect marine craft which do not have fuselages are multi-hulls.

The invention is the only mono-hull marine craft which produces aerodynamic lift without wings and has air based propulsion, air based control surfaces and a unique concave planing hull.

The invention is an airboat which has an extremely large speed range and is extremely maneuverable and versatile. It does this without compromising safety.

BRIEF DESCRIPTION OF THE DRAWINGS

In order that the invention may be more readily understood and put into practical effect, a preferred example of the invention will now be described with reference to the accompanying drawings, in which.

Figure 1:
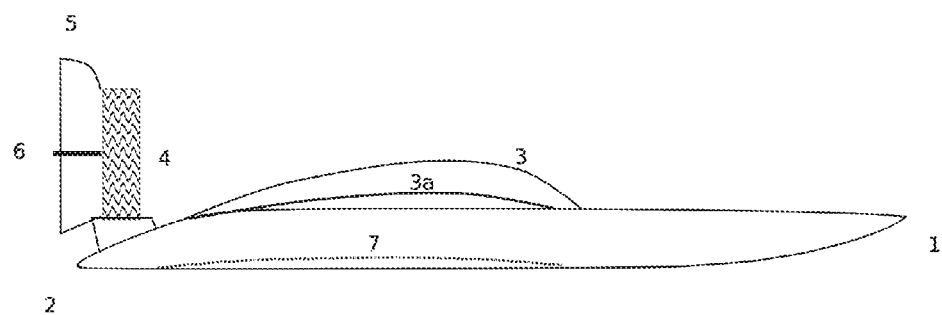
FIG. 1. Side view of invention
FIG. 2. Top view of invention
FIG. 3. Frontal view of the invention
Figure 2:
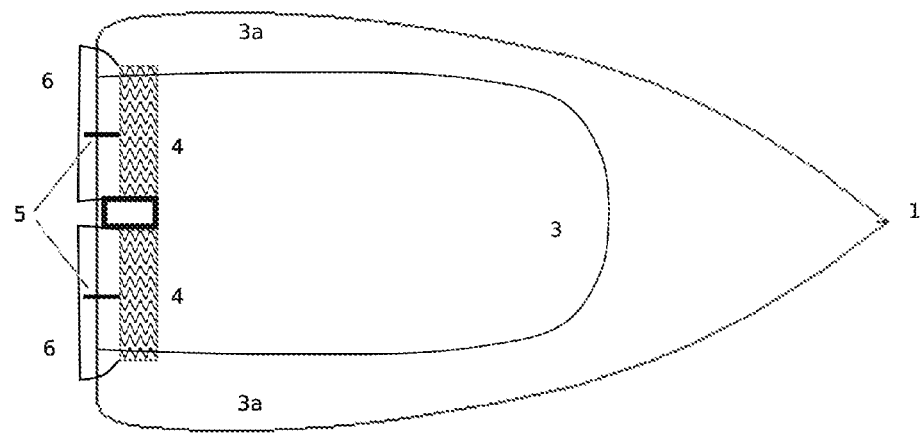
Figure 3:
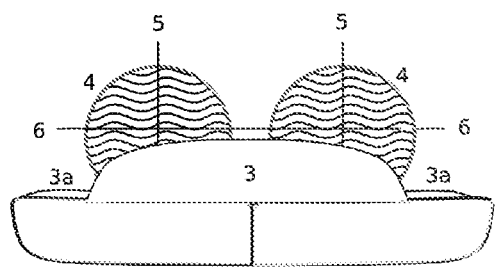

The drawings from FIG. 1 to FIG. 3 are labelled as per below:

1. Bow
2. Stern
3. Airfoil shaped superstructure
3a. Airfoil shaped deck
4. Air based propulsion
5. Rudder
6. Elevons (elevator cum aileron controlling both pitch and roll)

DETAILED DESCRIPTION OF PREFERRED EMBODIMENTS

The water craft is designed to be operated on and over a body of water. Although it is not obvious as the craft actually looks like a flat bottom boat from a far, the bottom of the hull is slightly concave in shape. The hull therefore provides the hydroplaning qualities and increased comfort like in U.S. Pat. No. 5,497,722 (English,Sr). The invention has certain key differences and improvements over U.S. Pat. No. 5,497,722 (English,Sr). Unlike U.S. Pat. No. 5,497,722 (English,Sr), the hull in the invention does not have parallel chines and it is also different in shape. Another key difference to U.S. Pat. No. 5,497,722 (English,Sr) is that the concave shape on the invention is not over the entire length of the hull. The triangular shaped hull in the invention also allows the bow of the craft 1 to spear through waves unlike a square bow of a conventional airboat and thus makes the invention a better marine craft. The concave shape on the triangular shaped hull also does not have substantially parallel sides as in U.S. Pat. No. 5,497,722 (English,Sr). The wide hull of the craft maximizes the benefit of a concave bottom shape because of its large bottom surface area and thus hydroplaning is even more efficient than prior art. Also unlike prior art, the concave bottom of the hull is hardly noticeable as it is only mildly concave but just enough to work effectively as a large suction cup providing unparalleled surface adhesion. Thus, the invention is extremely stable. The surface adhesion should be theoretically even more than in U.S. Pat. No. 5,427,048 (Takeuchi) which has dual concave channels as the concave shape on the invention covers a wider area. Surface adhesion is maximized in the invention by the fact that the concave shape covers a large area and the said concave shape is mildly concave; just like the curved surface of water when a large bowl is filled with water as opposed to a test tube filled with water. The downward protruding fins give greater traction and further enhance the craft's turning abilities and where necessary used as a procedure for stopping quickly and safely. The craft's hull has a naturally low draft and the mildly concave shape works very differently to prior art in that it is not a concave tunnel shape. The pointed bow 1 minimizes the bow wave whilst the mild concave shape at the bottom of the hull dissipates the already small bow wave under the bottom of the craft to a substantially wider area giving a very comfortable ride and greater speed.

The craft has air based control surfaces which effectively control the said craft on at least two axes unlike a conventional water propelled boat which controls only one axis. The elevons 6 which function like both elevators and ailerons of an aircraft control both pitch and roll of the craft and the rudders 5 control yaw.

The superior control together with the concave bottom hull and the air propulsion with twin variable pitch propellers allow unparalleled control, speed, versatility and safety. It should also be noted that by controlling pitch and roll, the craft can turn without rudder at high speed. A significant part of the elevons 6 and air based rudder 5 are placed further aft of the air based propulsion 4 which provide almost instant control even when the craft is at lower speeds. It should also be noted that the invention may use water based propulsion and water based rudders at lower speeds.

The craft also has a low centre of gravity which makes the craft even more stable. The elevons 6 are also actuated electronically and enhance the craft's capabilities. The electronically controlled elevons 6 stabilise the craft at high speed as well as allowing the craft to travel over ocean waves at high speed without slamming or pounding which is a phenomenon normally experienced by most marine vessels. The elevons 6 in the invention are able to do this effectively due to various onboard sensors and the use of Digital Signal Processing (DSP). The elevons 6 also assist the craft to start planing faster.

Prior art on aerodynamic lift for marine craft use tunnel hulls or wings. The invention is a triangular shaped monohull where the superstructure and parts of the deck produce aerodynamic lift. The top surface of the cabin 3 and the top surfaces of the decks on the port and starboard sides of the cabin 3a are shaped like the top surface of an airfoil. The bow 1 of the boat which produces hydrodynamic lift also produces aerodynamic lift whilst also parting the airflow to the port and starboard sides. Thus there is nett resultant aerodynamic lift over the whole craft. The invention also employs aircraft-like lift enhancement devices to enhance the aerodynamic lift particularly over the port and starboard side decks. The portions of deck particularly on the port and starboard sides 3a of the cabin near the stern of the craft 2 may be further extended to produce more aerodynamic lift.

U.S. Pat. No. 8,453,591 (Mannerfelt et al) is prior art of a normal mono hull power boat with small surface effect wings which retract into cavities. It should be further noted that the vehicle described in U.S. Pat. No. 8,453,591 (Mannerfelt et al) has no mention of air based propulsion or air based control surfaces which can only mean that the vehicle must have its propulsion at least constantly in the water and also cannot have any superior control at high speed when most of the vehicle is out of the water. The only similarities therefore between the invention and U.S. Pat. No. 8,453,591 (Mannerfelt et al) is that they both look more like normal boats as compared to other wing in ground-effect vehicles which look more like airplanes than boats. The immediate visible difference between the invention and a normal airboat is the invention has a pointed bow and control surfaces acting on more than one axis whilst the normal airboat has a square bow and air based rudders which only control one axis. The visible difference between the invention and wing in ground-effect vehicles is that the invention has no wings and no fuselage. In terms of propulsion, operation, hull and how the invention achieves aerodynamic lift the invention is uniquely different to all other water craft; e.g. airboats, normal water propelled boats and wing in ground-effect craft.

Figure 4:
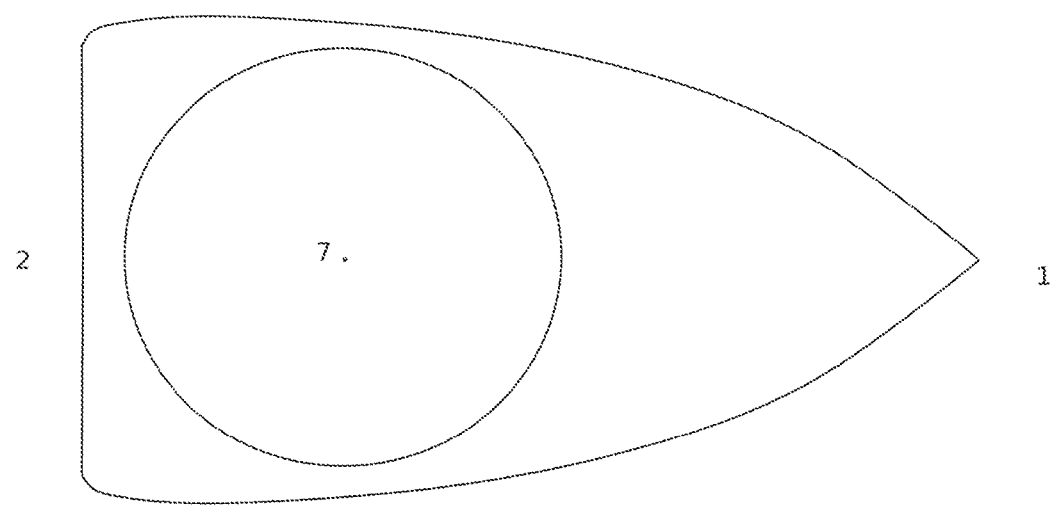
FIG 4: Bottom view of the invention, in accordance with one embodiment of the invention.

The mild concavity in the bottom of the hull is shown by the dotted (phantom) line 7 in FIG. 1. In addition, FIG. 4 shows one illustration of the mild concave shape of the bottom of the hull. This mild concave shape is not a concave tunnel shape but rather has a focal point.

While the invention has been particularly shown and described with reference to the preferred embodiment thereof, it will be understood by those skilled in the art that various change in forms and details may be made therein without departing from the spirit and scope of the invention.

The embodiments of the invention in which an exclusive property or privilege is claimed are defined as follows:

1. A craft for use over water comprising:
   a monohull that is a triangular shaped planing hull having a pointed bow (1), a stern (2), port and starboard sides;
   air based propulsion (4) connected to said planing hull;
   wherein, the widest point of the planing hull is towards the stern (2) of the said craft and the narrowest point of the said planing hull is at the bow (1) of the said craft;
   wherein, a depth of the planing hull on a centreline is deeper than the depth at the port and starboard sides at the bow (2) section of the said planing hull;
   wherein, the depth of the planing hull on the centreline does not exceed the depth at the port and starboard sides at least at an under section of the said planning hull amidship; and
   at least two air based control surfaces (5, 6) that control the craft on at least two axes, including by controlling a pitch of the craft and a roll of the craft,
   wherein at least a middle portion of the said planing hull has a bottom surface which is concave in shape,the concave shape having a focal point (7).

2. A craft as claimed in claim 1, wherein the at least two air based control surfaces (5, 6) also control a direction of thrust from the air based propulsion (4) on the at least two axes.

3. A craft as claimed in claim 1 wherein at least a middle portion of the said planing hull has a bottom surface which is concave in shape where the height of the focal point (7) of the concave shape is less than 10 percent of the width of the craft's beam.

4. A craft as claimed in claim 3 wherein the superstructure (3) is shaped like the top surface of an airfoil at least.

5. A craft as claimed in claim 1, further comprising a superstructure (3) that is shaped like a top surface of an airfoil.

6. A craft as claimed in claim 1 further comprising a deck wherein the deck area (3a) has, on the port and starboard sides, a top surface shaped like a top surface of an airfoil.

7. A craft as claimed in claim 1 wherein at least a portion of the planing hull has a bottom surface with a concave section.

8. A craft as claimed in claim 1, wherein the craft has an external contour as viewed in plan view wherein the port and starboard sides are arcuate and converge to the pointed bow and wherein the stern has a substantially straight edge extending laterally across a majority of a width dimension of the craft.

9. A craft as claimed in claim 1, wherein the at least two air based control surfaces (5, 6) on the at least two axes include at least two elevons (6) and at least two air based rudders (5).

10. A craft as claimed in claim 1, wherein the craft is configured to produce aerodynamic lift without use of wings.

\* \* \* \* \*